US006742971B2

United States Patent
Tong

(10) Patent No.: US 6,742,971 B2
(45) Date of Patent: Jun. 1, 2004

(54) CUTTING INSERT

(75) Inventor: Nelson Pao Chung Tong, Massillon, OH (US)

(73) Assignee: Manchester Tool Company, Akron, OH (US)

( * ) Notice: Subject to any disclaimer, the term of this patent is extended or adjusted under 35 U.S.C. 154(b) by 8 days.

(21) Appl. No.: 10/079,629

(22) Filed: Feb. 19, 2002

(65) Prior Publication Data

US 2003/0156909 A1 Aug. 21, 2003

(51) Int. Cl.[7] .......................... B23P 15/28; B26D 1/00; B26D 3/00
(52) U.S. Cl. ....................... 407/117; 407/113
(58) Field of Search .................. 407/113, 114, 407/115, 116, 117

(56) References Cited

U.S. PATENT DOCUMENTS

| 632,678 | A | | 9/1899 | Dock |
|---|---|---|---|---|
| 3,813,746 | A | | 6/1974 | Price |
| 4,074,949 | A | | 2/1978 | Hochmuth et al. |
| 4,294,566 | A | | 10/1981 | Boone |
| 4,360,297 | A | | 11/1982 | Weber |
| 4,486,127 | A | | 12/1984 | Eckle |
| 4,629,372 | A | | 12/1986 | Huston |
| 4,832,541 | A | | 5/1989 | Noguchi et al. |
| 4,969,779 | A | | 11/1990 | Barten |
| 4,973,204 | A | | 11/1990 | Mihic |
| 4,988,242 | A | | 1/1991 | Pettersson et al. |
| 4,992,008 | A | | 2/1991 | Pano |
| 5,059,070 | A | | 10/1991 | Baker |
| 5,135,336 | A | * | 8/1992 | Noguchi et al. ............. 407/117 |
| D350,549 | S | * | 9/1994 | Lindstedt et al. .......... D15/139 |
| 5,375,948 | A | | 12/1994 | Lindstedt |
| 5,423,639 | A | | 6/1995 | Wiman |
| 5,511,911 | A | | 4/1996 | Katbi et al. |
| 5,676,495 | A | | 10/1997 | Katbi et al. |
| 5,704,737 | A | | 1/1998 | Alford |
| 5,806,934 | A | | 9/1998 | Massa et al. |
| 5,827,017 | A | | 10/1998 | Tagstrom et al. |
| 5,829,924 | A | | 11/1998 | Oshnock et al. |
| 5,833,403 | A | | 11/1998 | Barazani |
| 5,921,724 | A | | 7/1999 | Erickson et al. |
| 5,975,812 | A | * | 11/1999 | Friedman ..................... 407/114 |
| 6,238,147 | B1 | * | 5/2001 | Tagtstrom et al. .......... 407/117 |
| 6,249,950 | B1 | * | 6/2001 | Brask et al. .................. 29/434 |
| D470,517 | S | * | 2/2003 | Andersson ................. D15/139 |
| 2002/0197119 | A1 | * | 12/2002 | Kinukawa ................... 407/114 |

FOREIGN PATENT DOCUMENTS

WO    WO 00/13824    3/2000

* cited by examiner

*Primary Examiner*—A. L. Wellington
*Assistant Examiner*—Brian D. Walsh
(74) *Attorney, Agent, or Firm*—Watts Hoffmann Co.

(57) ABSTRACT

A metal cutting insert having a pair of cutting portions disposed on either side of a shank portion. Each cutting portion includes a forward cutting edge and two side cutting edges. Each side cutting edge forms part of a shelf that includes chip controlling/breaking structure and is defined by the juncture of a cutting surface with an upper boundary of a side face. The chip controlling structure includes a chip deflecting surface located adjacent the side cutting surface that includes a plurality of concave recesses that generate localized stiffening of a chip as it moves along the chip deflecting surface. Chip controlling structure located adjacent the forward cutting edge includes a downwardly sloping surface that forms part of a channel which extends from the forward cutting edge towards a shank portion of the insert. A pair of ridges located on either side of the channel rise upwardly and reach a height that is above the plane of the forward cutting edge. The width of the channel decreases in width for a portion of its extent. Radiused corner surfaces are provided which are especially effective as chip controlling surfaces during shallow turning operations.

23 Claims, 3 Drawing Sheets

CUTTING INSERT

TECHNICAL FIELD

The present invention relates generally to the machining of rotating workpieces and, in particular, to a cutting insert that may be used to perform grooving, turning, boring, face grooving, face turning and cut-off operations.

BACKGROUND ART

Metal cutting inserts, particularly the so-called dogbone shaped varieties, which have capabilities of removing metal in both the radial and axial directions have been known to the art for several decades. This style of insert initially was ground all over and offered no topographical features to reduce cutting pressures or assist in chip control.

Chip control is important on large workpieces where significant lengths of stock are to be removed from the outside diameter of the workpiece in the axial mode. Absence of chip control during this type of operation can be inconvenient and costly.

Enhancements to the early inserts of this type offered a variety of chip controlling devices which gave a significant degree of chip control in both the radial and axial directions. These early chip control enhancements also generally narrowed the radial mode chip to ease chip ejection. However, these enhancing mechanisms caused increased levels of cutting pressure due to the location, size and style of the chip control devices.

Later advancements in the art placed a greater amount of emphasis on a combination of chip control and reduction of cutting pressure or at least one feature in the axial mode, but did not offer similar improvements in the radial mode. Still other inserts offered improvements in the radial mode, but either did not have the uniform cutting edge required to generate a flat bottom groove or did not have the capability of performing turning operations in a productive fashion. Even further, some of the chip control devices were located in such a manner or restricted in size such that they could not offer chip control over a complete range of depths of cut in the axial mode.

DISCLOSURE OF INVENTION

The present invention provides a new and improved cutting insert that is capable of performing multiple machining operations, such as turning, grooving, parting, etc. and which includes chip controlling and chip breaking surfaces which improve chip management during its use.

According to the invention, the metal cutting insert has a forward face and at least one side face. An upper boundary of the forward face joins a forward cutting surface, such that the juncture of the forward cutting surface and the forward face defines a forward cutting edge. The side face has an upper boundary which joins a side cutting surface, such that the juncture of the side cutting surface and the upper boundary of the side face defines a side cutting edge. The side cutting edge forms part of a shelf that includes chip controlling structure including a chip deflecting surface that is positioned adjacent the cutting surface. In the preferred and illustrated embodiment, the width of the chip deflecting surface increases in a direction away from the front cutting edge and the chip controlling structure further includes a plurality of recesses spaced along the chip deflecting surface.

In the preferred and illustrated embodiment, the recesses increase in size in a direction away from the forward cutting edge, such that the recess nearest the forward cutting edge is the smallest of all the recesses that form part of the chip controlling structure.

With the present invention, the metal cutting insert can be used to perform a multitude of tasks. When the tool is moved radially with respect to a rotating workpiece, the forward cutting edge generally performs a cut-off or grooving operation. When the tool is moved axially with respect to the rotating workpiece, the tool is generally performing a turning operation.

The shelf which includes the side cutting edge and associated chip controlling structure, provides enhanced chip control. The deflecting surface which is preferably positioned immediately adjacent the cutting surface induces the chip to curl. The recesses which in the preferred embodiment are positioned along the chip deflecting surface tend to provide localized stiffening of the chip which in turn causes the chip to break relatively quickly thereby reducing the chance of producing large, unmanageable chips which could interfere with the machining operation.

According to a further feature of the invention, a forward chip controlling structure is associated with the forward cutting edge. In the illustrated embodiment, the forward chip controlling structure includes a pair of spaced apart inclined surfaces which run from the corners of the insert to a position intermediate the centerline, such that a channel is formed which extends from the forward cutting edge towards an intermediate section of the cutting insert. With the disclosed construction, as the forward edge of the insert enters the rotating workpiece, a chip is generated which moves across the forward cutting edge and onto spaced apart, arcuate ridges which at least partially define the inclined surfaces. As the chip is being formed, it is supported by the spaced apart ridges, thus causing the chip to stiffen due to bending imposed in the area of a chip that is traveling over the channel where it is unsupported. As a result of the stiffening, the chip tends to break off quickly, thus, reducing the chances of producing long chips which could interfere with the machining operation.

In the exemplary embodiment, the cutting portion of the metal cutting insert includes a second side cutting edge which forms part of a second shelf. In the preferred embodiment, a second shelf includes substantially the same chip controlling structure as that of the first shelf. With the preferred construction, the insert can be used to cut in either axial direction. For example, the metal insert can be moved radially into a rotating workpiece to create a groove having a width substantially equal to the width of the metal insert. The insert can then be moved axially in either direction to widen the groove.

According to the invention, the forward cutting edge is preferably continuous and located in a common plane. With this construction, when the metal insert is moved radially into the workpiece, the bottom of the groove that it creates is substantially flat.

According to a further feature of the invention, the metal cutting insert preferably includes metal cutting portions disposed on either side of a shank portion. In the preferred construction, when one of the cutting portions is worn, the tool is removed from its tool holder and rotated 180° in order to position the opposite, unused cutting portion into a machining position.

In the preferred construction, the insert is formed from a relatively hard material, such as carbide, cermet or ceramic. The insert may be molded using a powder metal technology that is known in the art. In the preferred embodiment, the insert is molded using known technology and is intended for single use. With the preferred construction, the cutting insert is disposed of after its cutting portions are worn and is not intended to be resharpened or remanufactured.

Additional features of the invention will become apparent and a fuller understanding obtained by reading the following detailed description made in connection with the accompanying drawings.

BEST MODE FOR CARRYING OUT THE INVENTION

Figure 1:
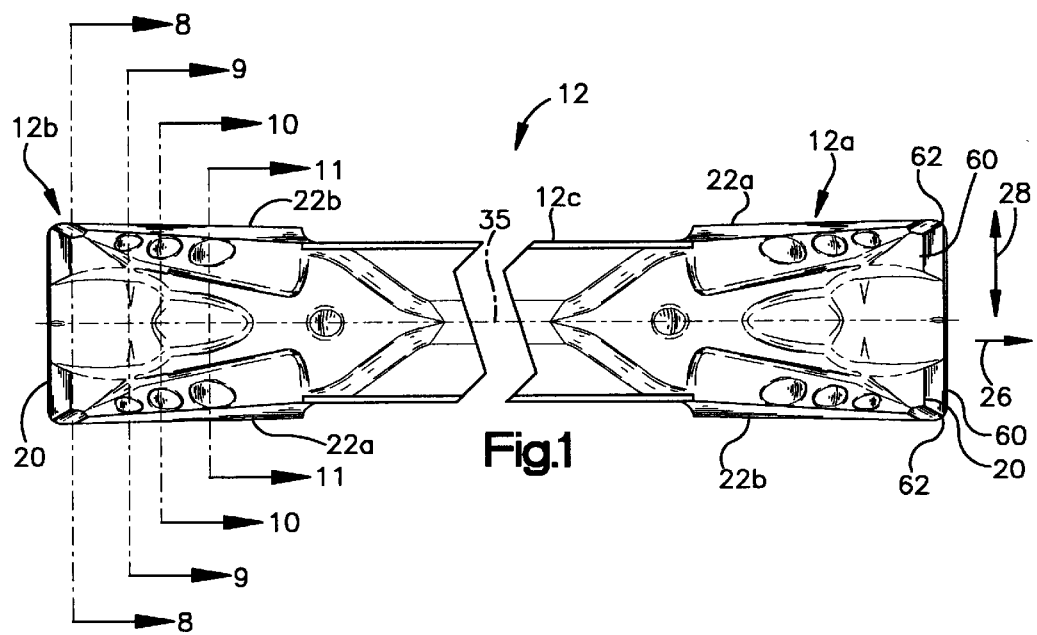
FIG. 1 is a fragmentary, plan view of a cutting insert constructed in accordance with a preferred embodiment of the invention.

FIG. 1 illustrates the overall construction of a metal cutting insert 12 constructed in accordance with the preferred embodiment of the invention. In use, the insert is clamped in a tool holder (not shown). In general, the tool holder forms part of a slide mechanism which positions a cutting edge or edges of the cutting insert 12 into contact with a rotating workpiece (not shown) in order to perform a cutting or machining operation on the workpiece. The tool holder and/or the other components of the machine tool with which the cutting insert is used are well known in the art and do not form part of the present invention.

In the disclosed embodiment, the insert 12 includes a pair of cutting portions 12a, 12b disposed on either side of a shank portion 12c. In use, the shank portion 12c of the insert 12 is clamped to a tool holder which locates and supports one of the cutter portions i.e. 12a at a machining position. When the one cutting portion 12a is worn, the insert 12 is rotated 180° in the tool holder in order to locate the other cutting portion 12b at the machining position.

Figure 2:
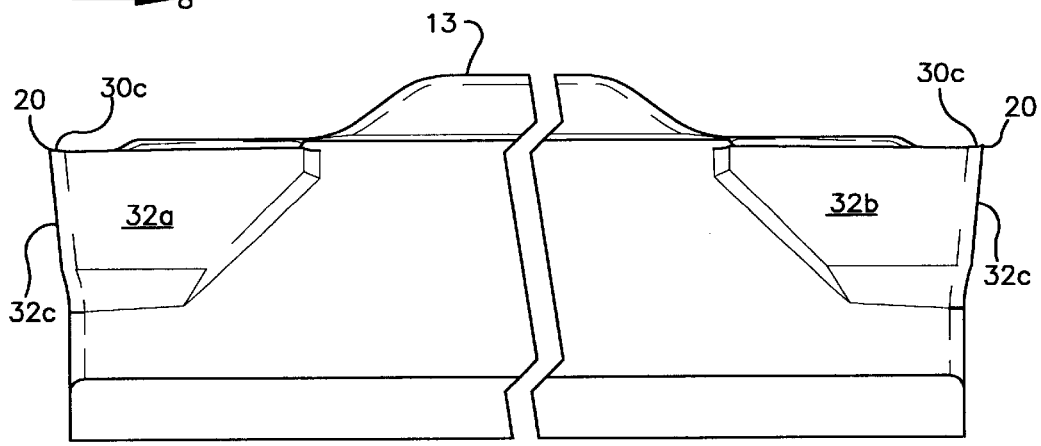
FIG. 2 is a side view of the cutting insert shown in FIG. 1.
Figure 3:
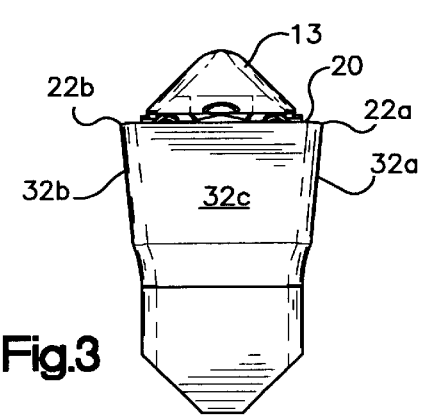
FIG. 3 is an end view of the cutting insert.

As seen best in FIGS. 2 and 3, the insert 12 includes an upwardly extending protuberance 13 which is engageable by a tool holder (not shown). The engagement of the protuberance 13 by the tool holder serves to rigidly mount the insert 12 in its operative position, with one of the cutting portions being presented in a position where it can perform machining operations on a rotating workpiece. The illustrated protuberance 13 should be considered but an example of how the disclosed insert can be held in a tool holder, and the present invention should not be considered limited to the illustrated tool holder engaging structure 13.

In the preferred embodiment, the cutting insert 12 is formed from a relatively hard material, such as carbide, cermet, ceramic, etc. Preferably, the insert is molded using a powder metal technology that is known in the art. The invention however contemplates other methods and technologies for forming or making the insert as well as materials other than those identified above.

The cutting portion 12a of the insert 12 includes a forward cutting edge 20 and a pair of side cutting edges 22a, 22b. The configuration of the disclosed insert allows the insert to be used for both turning and grooving/cut-off operations. In general, the slide mechanism (not shown) to which the cutting insert 12 is attached via its holder (not shown) can move the insert 12 in two mutually orthogonal directions. The path of movement is indicated by the arrows 26, 28. When the insert 12 is to be used to perform a grooving or cut-off (sometimes termed "parting") operation, it is moved towards the rotating workpiece (not shown) along the path indicated by the arrow 26. For purposes of explanation this may be termed the "radial direction." When the cutting insert 12 is to perform a turning operation, it may move in a path indicated by the reference character 28 which is generally parallel to the axis of rotation of the workpiece (not shown). For purposes of explanation this may be termed the "axial direction."

When the insert 12 is moved in the radial direction, the bulk of the metal cutting is borne by the forward cutting edge 20. When moved in the axial direction, one of the side cutting edges 22a, 22b is responsible for the bulk of the cutting. It should be understood that for some operations the insert may be moved along a non-linear path that has both radial and axial components.

Figure 4:
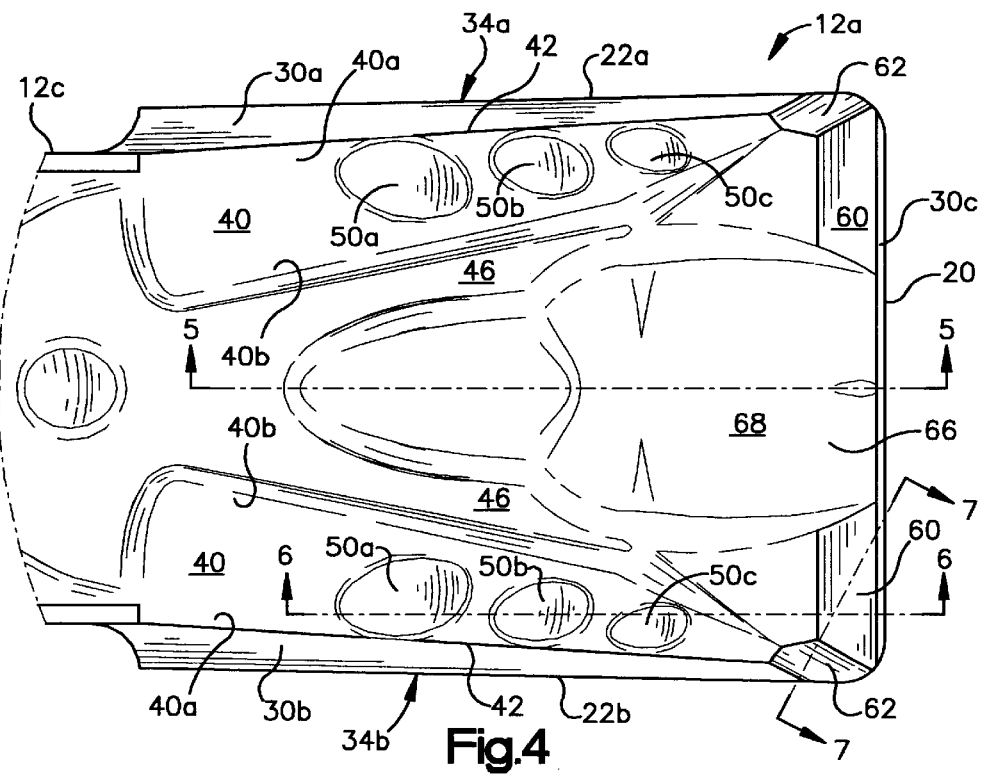
FIG. 4 is an enlarged fragmentary view of a cutting portion of the cutting insert shown in FIG. 1.
Figure 7:
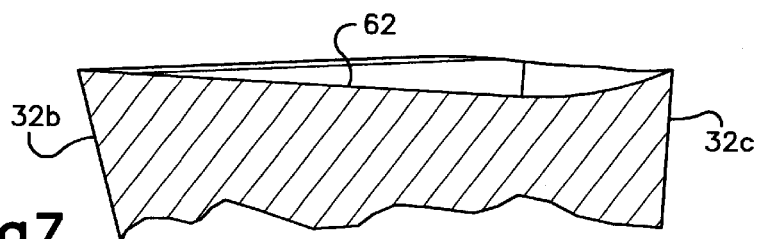
FIG. 7 is a fragmentary sectional view as seen from the plane indicated by the line 7—7 in FIG. 4.
Figure 8:
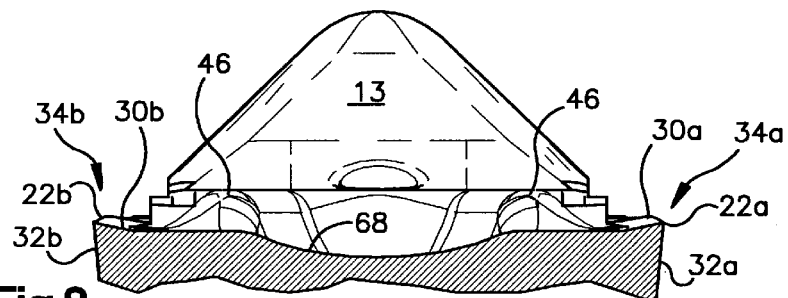
FIG. 8 is a fragmentary sectional view as seen from the plane indicated by the line 8—8 in FIG. 1.
Figure 9:
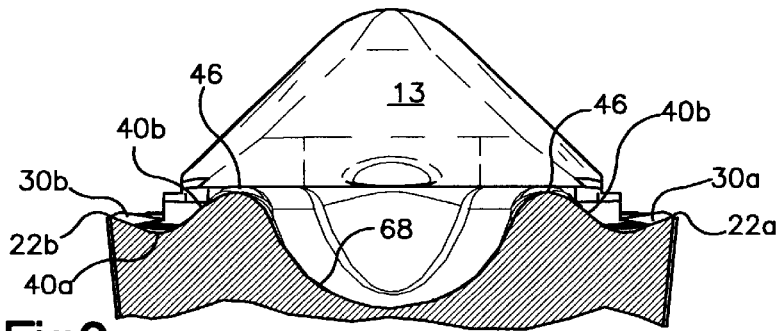
FIG. 9 is a fragmentary sectional view as seen from the plane indicated by the line 9—9 in FIG. 1; and, FIG. 10 is a fragmentary sectional view as seen from the plane indicated by the line 10—10 in FIG. 1.
Figure 10:
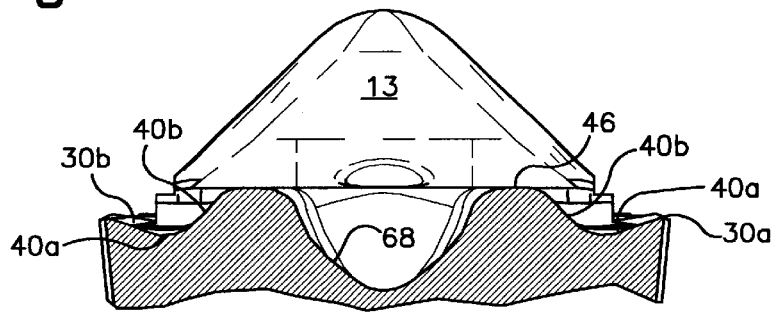
Figure 11:
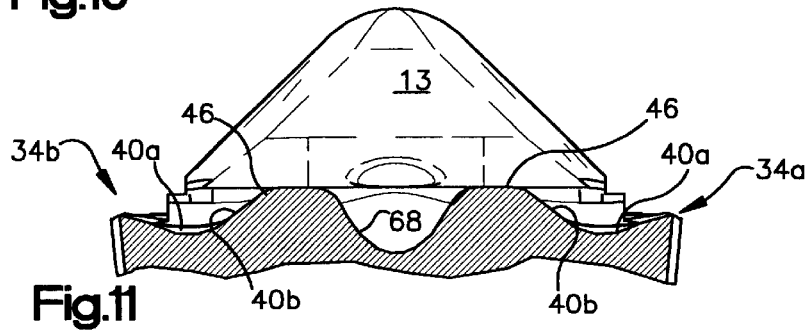
FIG. 11 is a fragmentary sectional view as seen from the plane indicated by the line 11—11 in FIG. 1.

As will be explained, each of the cutting edges 20, 22a, 22b has associated chip controlling/breaking surfaces. Referring to FIGS. 4 and 7, each side cutting edge 22a, 22b forms part of an associated shelf 34a, 34b. In particular, each side cutting edge 22a, 22b is defined by an associated downwardly sloped cutting surface (also termed positive rake surface) 30a, 30b and an upper boundary of an associated side face 32a, 32b, respectively, formed on the body of the insert 12.

Referring to FIG. 2, the forward cutting edge 20 is defined by a narrow planar, cutting surface 30c and a front side wall or face 32c.

In the illustrated embodiment, the edges 20, 22a, 22b are all located in a common plane which, in the preferred construction of this embodiment, has a slight downward slope, with the high point of the plane being located at the forward cutting edge 20. In other insert constructions that incorporate features of the present invention, the edges 20, 22a, 22b may be in different planes and therefore the invention should not be limited to the configuration shown in the drawings.

The chip breaking surfaces forming part of the respective shelves 34a, 34b and associated with a side cutting edge are best shown in FIGS. 4, 6 and 8–11. In the preferred construction, the insert 12 is symmetrical about a vertical plane (i.e. a plane oriented orthogonal to the forward cutting edge 20) and that passes through a centerline 35. Thus, in the preferred embodiment, the chip forming/breaking surfaces associated with the cutting edge 22a are the same as the chip forming/breaking surfaces associated with the cutting edge 22b. To simplify the explanation, only the surfaces associated with the cutting edge 22a will be described.

As indicated above, sloping downwardly from the cutting edge 22a is a planar cutting surface 30a. In the preferred embodiment, the width of the planar cutting surface 30a increases as one moves along the cutting edge 22a from the forward cutting edge 20 to the shank portion 12c. A chip forming/chip deflecting surface or ledge surface 40 (shown best in FIG. 4) is positioned immediately adjacent the cutting surface 30a and forms part of the associated shelf 34a, 34b. In the preferred embodiment, the width of the ledge surface 40 gradually increases with the widest portion of the ledge being closest to the shank 12.

The ledge surface 40 is defined by a first descending portion 40a that commences at an inner edge 42 of the cutting surface 30a and then rises upwardly to form one side 40b of a ridge 46 (see also FIGS. 8–11). A plurality of recesses or concave cavities 50a, 50b, 50c are formed in the ledge or chip deflecting surface 40. In the preferred and illustrated embodiment, three recesses are formed in each ledge surface, each recess being larger than the recess positioned immediately to the right as viewed in FIG. 4. The recesses 50a, 50b, 50c may take on various shapes including circles, ellipses, or combinations thereof.

In operation, as metal is cut from the workpiece by the side edge 22a, a chip is formed which moves downwardly along the cutting surface 30a and enters the region defined by the chip forming/chip deflecting ledge surface 40. The upwardly directed ledge surface portion 40b deflects the chip upwardly and causes it to curl into an arcuate configuration. As the chip passes over and through the recesses 50a, 50b, 50c, portions of the chip move downwardly into the recesses which creates localized stiffened portions of the chip (as compared to the remainder of the chip). This localized stiffening of the chip, coupled with the curling induced by the deflection surface 40b, causes the chip to break, thus reducing the possibility of having the chip become entangled in the workpiece and/or cutting insert. In the preferred embodiment and as described above, the ledge surface 40 tapers outwardly, such that the width of the ledge surface 40 near the shank portion 12c is substantially larger than the width of the ledge surface at the forward cutting edge 20. As a result of this tapering, a cone configuration is imparted to the chip as it is curled further causing the chip to move away from the rotating workpiece.

Figure 5:
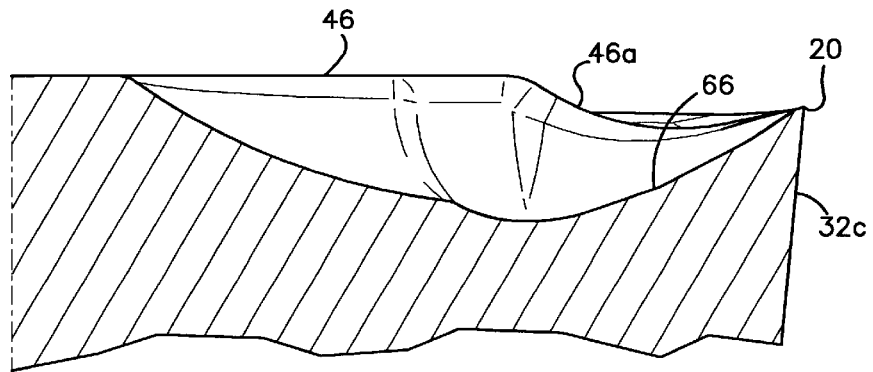
FIG. 5 is a fragmentary sectional view as seen from the plane indicated by the line 5—5 in FIG. 4.
Figure 6:
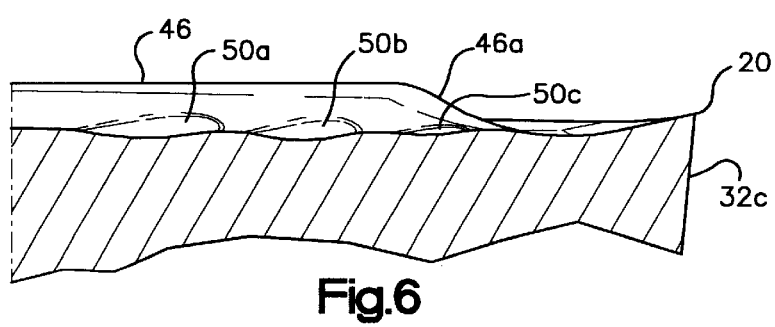
FIG. 6 is a fragmentary sectional view as seen from the plane indicated by the line 6—6 in FIG. 4.

Referring also to FIGS. 3 and 5, the forward cutting edge 20 and its associated chip controlling/breaking surfaces will be described. As indicated above, a narrow cutting surface 30c (shown best in FIG. 4) is located immediately to the inside of the cutting edge 20. In the preferred and illustrated embodiment, the cutting surface 30c has a uniform width. The chip controlling surfaces for the forward cutting edge 20 include a pair of spaced apart inclined surfaces (also termed positive rake surfaces) 60 which each run from an associated radiused corner surface 62 of the insert 12 to a position intermediate the centerline 35 of the insert 12 and associated corner surface 62 (see also FIG. 1).

Each chip control corner surface 62 is positioned between the forward end of the associated positive rake surfaces 30a, 30b and the outermost end of the associated positive rake surfaces 60. Each corner surface 62 are defined by a radius which, in the illustrated embodiment, may be 0.020 inches. The shape of the corner surfaces 62 are best shown in FIG. 7. Referring also to FIG. 4, these groove-like surfaces are oriented at an angle with respect to the side rake surfaces 30a, 30b and forward rake surfaces 60. It has been found that these curved corner surfaces are especially effective as chip controlling surfaces during shallow turning operations.

A more sharply sloping surface 66 (as compared to the surfaces 60) is positioned centrally and forms part of a channel 68 which extends from the forward cutting edge 20. This channel or valley 68 is located between the pair of ridges 46 (shown best in FIGS. 7–10). The depth of the valley 68 increases as one moves away from the forward edge 20 and then gradually decreases. The ridges 46 themselves are not of uniform height and as seen in FIG. 5 rise upwardly to form a chip deflecting slope 46a on each ridge 46. The width of the channel/valley 68 at first increases in width as the chip proceeds from the cutting edge 20 to allow for the chip to focus its impingement near the peak of the forward edge of ridge 46a. The channel/valley then decreases in width to accommodate the taper of the ridges from the side cutting edges.

In operation, as the forward edge 20 enters the workpiece, a chip is formed along the entire cutting edge 20 and moves towards the left as viewed in FIG. 4. Portions of the chip contact the rising slopes 46a of the ridges 46 and are deflected upwardly. However, the unsupported center portions the chip (the portions of the chip that cover or overlie the valley 68) tend to bend downwardly causing that portion of the chip to stiffen. In effect, the chip is supported solely by the two ridges 46 via a point or line contact. The upwardly sloping surfaces 46a tend to curl the chip and this, in combination with the stiffening of the central portion of the chip, by virtue of the localized support provided by the ridges 46 causes the chip to spiral and then break relatively quickly, thus reducing the possibility of the chip becoming entangled in the workpiece or insert.

In the preferred and illustrated embodiment, the forward cutting edge 20 and the side cutting edges 22a, 22b are in a common plane. In addition, in the preferred embodiment, the plane of the cutting edges slopes downwardly with respect to the forward cutting edge 20.

In the preferred and illustrated embodiment, the forward cutting edge 20 is continuous and uninterrupted. With this preferred construction, when the insert is moved radially into a workpiece, the groove it creates has a flat bottom. This is achieved without compromising the chip control capabilities of the insert when making radial cuts.

In the preferred embodiment, the cutting insert including the cutting portions 12a, 12b and shank 12 are molded using a known powder metal technology. Using this technology, a relatively inexpensive throw-away metal cutting insert can be created having extensive cutting and chip control capabilities. The metal cutting insert is capable of many cutting operations and is intended to be disposed of once both cutting portions are worn and is not intended to be resharpened or remanufactured.

Although the invention has been described with a certain degree of particularity, it should be understood that those skilled in the art can make various changes to it without departing from the spirit or scope of the invention as hereinafter claimed.

I claim:

1. A metal cutting insert having a forward face and spaced apart side faces, an upper boundary of said forward face joining a forward cutting surface, the juncture of the forward cutting surface and said forward face defining a forward cutting edge, each of said side faces having an upper boundary joining a side cutting surface the juncture of a side face and an associated side face upper boundary defining a side cutting edge, each side cutting edge forming part of a shelf that includes a chip controlling structure including a concave chip deflecting surface positioned immediately adjacent said cutting surface, the width of said concave chip deflecting surface increasing in a direction away from said front cutting edge and said chip controlling structure including a plurality of spaced apart, concave recesses spaced along said concave chip deflecting surface, with each recess increasing in size in a direction away from said forward cutting edge and a portion of said concave chip deflecting surface extending between each of the concave recesses.

2. The cutting insert of claim 1, further including a second chip controlling structure associated with said forward cutting edge, said chip controlling structure including a pair of spaced apart inclined surfaces which run from corners of the insert to a position intermediate the centerline, such that a channel is formed which extends from the forward cuffing edge towards an intermediate section of the cutting insert.

3. The cutting insert of claim 2, wherein said channel increases in width for a predetermined distance, and then decreases in width in a direction away from said forward cutting edge.

4. The cutting insert of claim 1, wherein each side chip controlling structure includes three recesses.

5. The cutting insert of claim 4, wherein each recess is generally elliptical in configuration.

6. The cutting insert of claim 1, wherein said cutting insert includes a raised protuberance spaced inwardly from the forward cutting edge which provides a clamping surface for holding said cutting insert in an associated insert holder.

7. The cutting insert of claim 6, wherein said forward and side cutting edges and associated chip controlling structure are formed on opposite ends of an insert body and separated by an intermediate section, such that said insert is reversible by rotating the insert 180°.

8. A metal cutting insert having a forward face and at least one side face, an upper boundary of said forward face joining a forward cutting surface, the juncture of the forward cutting surface and said forward face defining a forward cutting edge, said side face having an upper boundary joining a side cutting surface the juncture of said side cutting surface and said side face upper boundary defining a side cutting edge, said side cutting edge forming part of a shelf that includes chip controlling structure including a concave chip deflecting surface positioned immediately adjacent said cutting surface, the width of said concave chip deflecting surface increasing in a direction away from said front cutting edge and said chip controlling structure including a plurality of spaced apart, concave recesses spaced along said concave chip deflecting surface, with each recess increasing in size in a direction away from said forward cutting edge and a portion of said concave chip deflecting surface extending between each of the concave recesses.

9. The metal cutting insert of claim 8, further including another side face spaced from said one side face, said other side face having an upper boundary joining another side cutting surface, the juncture of said other side cutting surface and said other side face upper boundary defining a second side cutting edge spaced from said one side cutting edge, said other side cutting edge forming part of another shelf including other chip controlling structure including an associated chip deflecting surface positioned immediately adjacent said second side cutting surface.

10. The cutting insert of claim 9, wherein said second chip deflecting surface increases in width in a direction away from said front cutting edge and said other chip controlling structure further including a plurality of recesses spaced along said other chip deflecting surface.

11. A metal cutting insert comprising:
a) a pair of cutting portions disposed on either side of a shank portion;
b) clamping structure engageable by a cutting insert holder by which said metal cutting insert is held in an operative position at which one of said cutting portions is located in an operative position with respect to a rotating workpiece;
c) at least one of said cutting portions including forward cutting structure comprising:
i) a forward cutting edge for performing cutting operations on a rotating workpiece in a radial direction with respect to the axis of rotation of said workpiece;
ii) a downwardly sloping surface adjacent said forward cutting edge and centrally located, said sloping surface forming part of a channel which extends from the forward cutting edge towards the shank portion;
iii) a pair of ridges located on either side of said channel, said ridges rising upwardly and reaching a height that is above a plane of said forward cutting edge;
iv) the width of said channel decreasing in width for a portion of its extent, said upwardly rising ridges in cooperation with said channel generating localized stiffening of a chip as it proceeds along said ridges;
d) a side shelf defined on one side of said cutting portion, comprising:
i) a side cutting edge for performing cutting operations on a rotating workpiece as said cutting insert is moved in an axial direction with respect to said rotating workpiece;
ii) said cutting edge defined by an upper boundary of a side face defined by said cutting portion;
iii) said shelf further defining chip controlling structure including a concave chip deflecting surface positioned adjacent said side cutting edge and including a downwardly sloping portion that transitions into an upwardly sloping portion that joins one of said ridges;
iv) said concave chip deflecting surface including a plurality of spaced apart, concave recesses that are spaced along said side cutting edge and a portion of said concave chip deflecting surface extending between each of the concave recesses; and,
e) said side cutting edge and forward cutting edge located in a common plane.

12. The cutting insert of claim 11, wherein said one cutting portion includes a second shelf spaced from said first shelf and including a second side cutting edge defined by an upper boundary of an opposite side face.

13. The cutting insert of claim 11, wherein said recesses are substantially elliptical and increase in size in a direction away from said forward cutting edge.

14. The cutting insert of claim 11, wherein said chip deflecting surface formed on said one shelf, has an increasing width with the greatest width being nearest said shank portion.

15. The cutting insert of claim 11, further including a planar, side cutting surface located intermediate said side cutting edge and associated chip deflecting surface.

16. The cutting insert of claim 15, wherein said side cutting surface increases in width in a direction away from said forward cutting edge.

17. The cutting insert of claim 11, further including a forward cutting surface having uniform width located intermediate said forward cutting edge and downwardly sloping surface that forms part of said forward cutting structure.

18. The cutting insert of claim 17, wherein said forward cutting structure includes a pair of spaced apart downwardly inclined rake surfaces, an outer end of each of said rake surfaces joining an associated, radiused corner surface.

19. The cutting insert of claim 11, wherein said one cutting portion is molded from a carbide material.

20. The cutting insert of claim 1, wherein said insert is entirely molded from a carbide material is adapted to be used as a single use carbide insert.

21. The cutting insert of claim 1, wherein said insert is molded from cermet material.

22. The cutting insert of claim 1, wherein said insert is molded from ceramic material.

23. The cutting insert of claim 2, wherein said corners each define a radius surface that provides chip control during shallow turning operations.

* * * * *